(12) United States Patent
Tan et al.

(10) Patent No.: US 12,055,710 B2
(45) Date of Patent: Aug. 6, 2024

(54) TWO-DIMENSIONAL PHOTOELECTRIC AUTOCOLLIMATION METHOD AND DEVICE BASED ON WAVEFRONT MEASUREMENT AND CORRECTION

(71) Applicant: Harbin Institute of Technology, Harbin (CN)

(72) Inventors: Jiubin Tan, Harbin (CN); Yang Yu, Harbin (CN); Jian Shi, Harbin (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 398 days.

(21) Appl. No.: 17/477,638

(22) Filed: Sep. 17, 2021

(65) Prior Publication Data
US 2023/0032319 A1 Feb. 2, 2023

(30) Foreign Application Priority Data
Jul. 30, 2021 (CN) .......................... 202110876187.1

(51) Int. Cl.
*G02B 27/00* (2006.01)
*G01B 11/26* (2006.01)
(Continued)

(52) U.S. Cl.
CPC .......... *G02B 27/0025* (2013.01); *G01B 11/26* (2013.01); *G02B 17/08* (2013.01);
(Continued)

(58) Field of Classification Search
None
See application file for complete search history.

(56) References Cited

U.S. PATENT DOCUMENTS

| 2,870,671 | A | * | 1/1959 | Falconi | ..................... G01S 3/78 250/236 |
| 7,129,455 | B2 | | 10/2006 | Webb et al. | |
| 2009/0261233 | A1 | * | 10/2009 | Tamiya | .................. G01B 11/00 356/498 |

FOREIGN PATENT DOCUMENTS

| CN | 102176086 B | 7/2012 | |
| CN | 109163814 A * | 1/2019 | ............... G01J 9/00 |

(Continued)

OTHER PUBLICATIONS

Rochester (University of Rochester Department of Computer Science, "Rays: Casting and Paraxial Optics," https://www.cs.rochester.edu/u/nelson/courses/csc_160/2011_spring/readings/optics_reading.html, May 2, 2011) (Year: 2011).*

*Primary Examiner* — Uzma Alam
*Assistant Examiner* — Chad Andrew Reverman
(74) *Attorney, Agent, or Firm* — IPRO, PLLC

(57) ABSTRACT

The disclosure belongs to the technical field of precision test and measurement, and provides a two-dimensional photoelectric autocollimation method and device based on wavefront measurement and correction. According to the disclosure, a link of wavefront measurement and correction of a reference light path is added to a traditional autocollimator measuring method. By using wavefront distortion information of the reference light path in the instrument and driving a deformable mirror to compensate for phase distortion of a beam, the link realizes measurement and control on aberration of the optical system of the autocollimator and improves the imaging quality and spot positioning accuracy of the optical system, thereby improving the angle measurement accuracy of the autocollimator. At the same time, by introducing the link, the autocollimator has the ability to resist interference from the external environment, so that the resolution and stability of angle measurement of the auto- (Continued)

collimator are further improved. The method makes the traditional autocollimator have a nano-radian order ($5\times10^{-9}$ rad, that is 0.001") angle resolution and a sub-microradian order ($10^{-7}$ rad, that is 0.02") angle measurement accuracy. The disclosure has the technical advantage of realizing angle measurement with high resolution, high accuracy and high stability under the same conditions, and has the abilities to resist environmental disturbances and compensate for errors caused by the disturbances.

7 Claims, 3 Drawing Sheets

(51) Int. Cl.
  *G02B 17/08* (2006.01)
  *G02B 26/08* (2006.01)
  *G02B 27/28* (2006.01)
  *G02B 27/30* (2006.01)
(52) U.S. Cl.
  CPC ....... *G02B 26/0825* (2013.01); *G02B 27/283* (2013.01); *G02B 27/30* (2013.01)

(56) References Cited

FOREIGN PATENT DOCUMENTS

| | | | | |
|---|---|---|---|---|
| CN | 109163814 A | | 1/2019 | |
| CN | 109579779 A | * | 4/2019 | ............... G01C 1/00 |
| CN | 109579779 B | | 1/2021 | |
| CN | 109579778 B | | 5/2021 | |

* cited by examiner

TWO-DIMENSIONAL PHOTOELECTRIC AUTOCOLLIMATION METHOD AND DEVICE BASED ON WAVEFRONT MEASUREMENT AND CORRECTION

TECHNICAL FIELD

The disclosure belongs to the technical field of precision test and measurement, and particularly relates to a two-dimensional photoelectric autocollimation method and device based on wavefront measurement and correction.

BACKGROUND

With the continuous development of ultra-precision machining and manufacturing, large equipment manufacturing, big science projects and other fields, there is an urgent need for an autocollimation angle measurement technology that can achieve high resolution, high accuracy and high stability in a large measurement range and have a certain anti-interference ability to the measurement site. The technology plays an important supporting role in the development of the above fields.

In the field of ultra-precision machining and manufacturing, a combination of an autocollimator with a plane mirror, a polygon prism and the like can measure shape tolerance and position tolerance of components, with an angle resolution of up to 0.1" to 0.001". In the process of manufacturing and installing large equipment, the autocollimator cooperates with a cooperative target, and the measurement distance can reach several or even tens of meters. In an assembly workshop, the autocollimator is used to remotely measure the yaw and pitch in real time to monitor the equipment posture. In the field of big science projects, the autocollimator can be used to measure the rotation accuracy of large scientific instruments, the linear accuracy of a linear motion and the relative posture and position between instruments. In addition, the above application scenarios are not limited to testing rooms and laboratory environments. Due to the limitation of the measured target, there is a need for an autocollimation instrument that can realize real-time, long-distance, high-accuracy and high-stability measurement in the manufacturing site, the assembly workshop and even field environment.

A photoelectric autocollimator is based on the principle of optical autocollimation. The traditional structure is shown in FIG. 1. The device includes a laser source 1, a first convex lens 41, a first beam splitter 2 and an image sensor 3. A beam emitted from the laser light source 1 is collimated by the convex lens 41 into a parallel beam which enters a reflecting surface of a measured object 5. The beam reflected from the reflecting surface of the measured object 5 converges via the convex lens 41, and the image sensor 3 collects spot information. Angle information of the measured object 5 can be calculated by using the spot position information.

The autocollimator in the traditional structure has the following problems:

The collimating objective lens is a single lens with a focal length of generally about 500 mm that is difficult to continue to improve, and the limit displacement resolution of a commonly used photoelectric sensor is 30 nm to 50 nm, so according to the measurement principle, it is difficult for the autocollimator to realize the nano-radian order angle measurement. The single-lens optical system has large spot aberration, and the photoelectric sensor has large spot positioning errors, so it is difficult for the autocollimator to realize high-accuracy angle measurement. The light source of the autocollimator is generally a laser light source. Due to the luminous mechanism, the exit beam has parallel drift and angular drift, so it is difficult for the autocollimator to realize high-stability measurement. The structure itself does not have any compensation link, and is extremely susceptible to external disturbances. For example, under long-distance measurement conditions, air disturbances will cause additional angular drift of the reflected beam, which will reduce the measurement accuracy and stability of the autocollimator.

In conclusion, affected by the hardware limitations from the optical system and the sensor, the sensitivity to the measurement environment, the influence of air disturbances and various other factors that greatly restricts the technical indexes and application scenarios of the autocollimator, it is difficult for the traditional photovoltaic autocollimator to realize nano-radian order angle measurement tasks with long distance, high resolution, high accuracy and high stability in a complex environment.

SUMMARY

In order to overcome the defects in the autocollimator measuring method and device in a traditional structure to realize angle measurement with high accuracy, high resolution and high stability, the disclosure provides a two-dimensional photoelectric autocollimation method and device based on wavefront measurement and correction.

The two-dimensional photoelectric autocollimation method based on wavefront measurement and correction according to the disclosure includes the following steps:

step a, light emitted from a laser light source passes through a stop, a beam splitter, a deformable mirror, a plane mirror and a collimating objective lens group to form a collimated light beam that exits;

step b, the exit beam is split by a first polarization beam splitter in the instrument, wherein the transmitted beam is incident upon a measured mirror outside the instrument as a measuring beam, and is reflected and carries two-dimensional angle change information of a measured target; wherein the reflected beam is incident upon a reference mirror fixed in the instrument as a reference beam and returns along the original path;

step c, the measuring beam and the reference beam return along the original exit light path, and are reflected by the first beam splitter and split by a second polarization beam splitter; wherein the transmitted beam serves as the measuring beam received by an image sensor; wherein the reflected beam serves as the reference beam that converges via the convex lens to form parallel light received by a wavefront sensor;

step d, the wavefront sensor acquires drift distances and wavefront phase information of the reference beam, and the controller calculates and gives phase parameters for driving compensation of the deformable mirror to reduce aberration of the optical system; or software calculates a spot positioning error value caused by the current drift distances and wavefront phase information;

step e, after the link of wavefront measurement and correction, the image sensor measures displacement values of an incident measuring beam spot, wherein distances of the spot deviating from a center position of the image sensor are respectively x1 and y1; and step f, α is calculated according to x1=f·tan(2α) based on the displacements x1 and y1 of the measuring beam spot, wherein α is an angle of yaw generated by the measured object after the compensation; and β is calculated according to y1=f·tan(2β), where β is an angle of pitch generated by the measured object after the compensation.

The two-dimensional photoelectric autocollimation device based on wavefront measurement and correction according to the disclosure includes the following contents:

The device includes a laser light source, a first beam splitter, an image sensor, a first convex lens, a concave lens, a plane mirror, a second convex lens, an aperture stop, a first turning mirror, a second turning mirror, a first polarization beam splitter, a reference mirror, a second polarization beam splitter, a deformable mirror, a third convex lens and a wavefront sensor.

Light emitted by the laser light source is collimated by the second convex lens to become parallel light incident upon the aperture stop, and the transmitted beam is sequentially transmitted by the first beam splitter, reflected by the first turning mirror, reflected by the second turning mirror and transmitted by the collimating objective lens group to become a parallel beam; the parallel beam is split by the first polarization beam splitter into a transmitted beam and a reflected beam with polarization states perpendicular to each other; the transmitted beam serves as a measuring beam normally incident upon the plane mirror; the reflected beam serves as a reference beam normally incident upon the reference mirror; the two beams return along the original path after being respectively reflected by the mirrors, are reflected by the first beam splitter and split by the second polarization beam splitter such that the reference beam and the measuring beam are separated; and the measuring beam is transmitted and normally incident upon the image sensor for collection and imaging, and the reference beam is reflected and transmitted by the third convex lens to become parallel light incident upon the wavefront sensor for collection and imaging.

The laser light source is located at a focal plane of the second convex lens, and the exit light is parallel light.

The aperture stop serves as an object plane and is located at an equivalent focal plane of the collimating objective lens group.

The collimating objective lens group is composed of the first convex lens and the concave lens to constitute a telephoto objective lens group whose focal length is much greater than that of the first convex lens, thereby improving a limit angle resolution of the autocollimator.

The third convex lens is located on the right side of a convergence focus of the reflected beam of the second polarization beam splitter, the focus is located at a focal plane of the third convex lens, and the reference beam is reflected by the second polarization beam splitter, converges and diverges, and is transmitted by the third convex lens to become a parallel beam incident upon a center position of the wavefront sensor.

Beneficial Effects of the Disclosure

According to the two-dimensional photoelectric autocollimation method based on wavefront measurement and correction provided by the disclosure, the link of wavefront measurement and correction of a reference light path is added to a traditional autocollimator measuring method. By using the wavefront distortion information of the reference light path in the instrument and driving the deformable mirror to compensate for the distorted phase of the beam, the link realizes measurement and control on the aberration of the optical system of the autocollimator and improves the imaging quality and spot positioning accuracy of the optical system, thereby improving the angle measurement accuracy of the autocollimator. At the same time, by introducing the link, the autocollimator has the ability to resist interference from the external environment, such as temperature changes, micro-vibrations and air disturbances, so that the resolution and stability of the angle measurement of the autocollimator are further improved. The method makes the traditional autocollimator have a nano-radian order ($5 \times 10^{-9}$ rad, that is 0.001") angle resolution and a sub-microradian order ($10^{-7}$ rad, that is 0.02") angle measurement accuracy.

Compared with the traditional autocollimator structure, the two-dimensional photoelectric autocollimation device based on wavefront measurement and correction provided by the disclosure has the following advantages:

(1) The single collimating objective lens is replaced with the telephoto objective lens group to increase the focal length and reduce the volume of the light path, so that the limit angle resolution of the system is increased to the nano-radian order under the same conditions.

(2) The introduction of the reference beam realizes the measurement and control on the aberration of the optical system of the autocollimation device, and improves the spot imaging quality and the spot positioning accuracy, thereby improving the measurement accuracy and stability of the autocollimator.

(3) The laser light source is replaced with the light transmitted through the aperture stop as the light source of the autocollimator, so that the measurement instability caused by the drift of the light source itself is reduced.

(4) The turning mirrors fold the long-focus light path of the system twice, so that the device has a smaller volume and is more suitable for the on-site measurement environment, and the influence of the air disturbances on the beam transmission caused by the oversize of the device is avoided.

Therefore, compared with the traditional autocollimating angle measurement device, the disclosure has the technical advantage of realizing angle measurement with high accuracy and high stability while achieving a nano-radian order limit angle resolution under the same measuring range, and has the abilities to resist environmental disturbances and compensate for errors caused by the disturbances.

In the figures: 1 laser light source, 2 first beam splitter, 3 image sensor, 4 collimating objective lens group, 41 first convex lens, 42 concave lens, 43 first combined lens, 44 second combined lens, 5 plane mirror, 6 second convex lens, 7 aperture stop, 8 first turning mirror, 9 second turning mirror, 10 first polarization beam splitter, 11 reference mirror, 12 second polarization beam splitter, 13 third convex lens, 14 wavefront sensor, 15 deflecting mirror, 16 deformable mirror, 17 deformable mirror driver.

DETAILED DESCRIPTION

Specific examples of the disclosure will be further described below in detail in conjunction with the accompanying drawings.

Specific Example I

This example is a specific example of a two-dimensional photoelectric autocollimation method and device based on wavefront measurement and correction.

Figure 1:
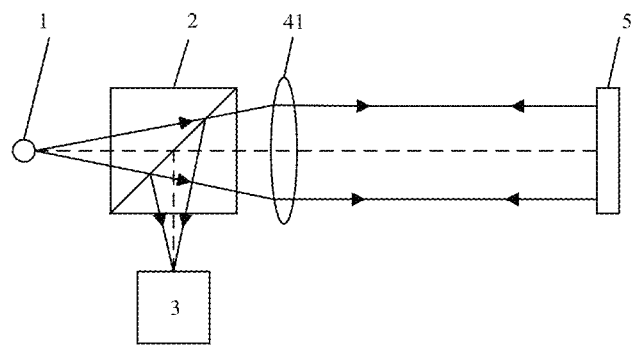
FIG. 1 is a schematic structural diagram of a traditional autocollimating angle measurement device.
Figure 2:
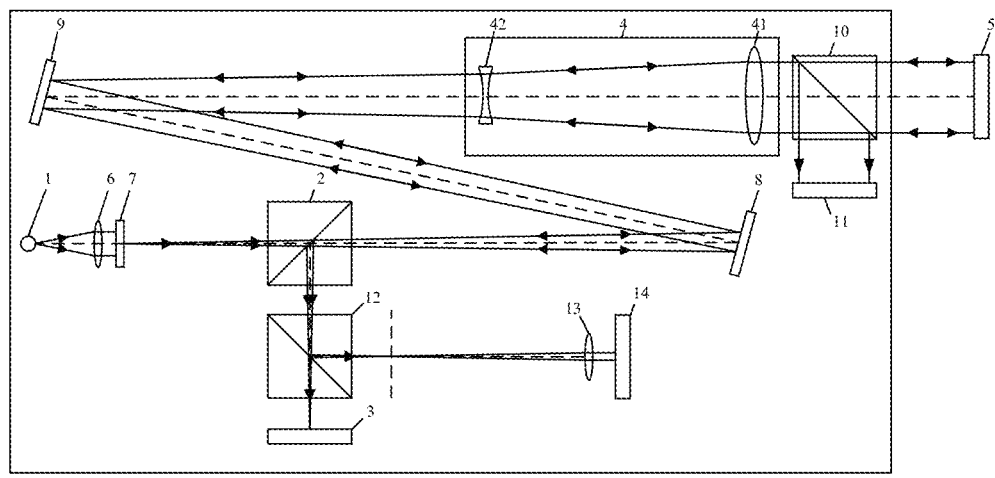
FIG. 2 is a schematic structural diagram of Specific Example I of a two-dimensional photoelectric autocollimation method and device based on wavefront measurement and correction according to the disclosure.

A schematic structural diagram of the two-dimensional photoelectric autocollimation device based on wavefront measurement and correction of this example is shown in FIG. 2. The angle measurement device includes a laser light source 1, a first beam splitter 2, an image sensor 3, a first convex lens 41, a concave lens 42, a plane mirror 5, a second convex lens 6, an aperture stop 7, a first turning mirror 8, a second turning mirror 9, a first polarization beam splitter 10, a reference mirror 11, a second polarization beam splitter 12, a third convex lens 13 and a wavefront sensor 14.

Light emitted from the laser light source 1 is collimated by the second convex lens 6 and then incident upon the aperture stop 7 in parallel. Taking the aperture stop 7 as an object plane, the two emitted beams are transmitted by the first beam splitter 2, reflected by the first turning mirror 8 and the second turning mirror 9, normally incident upon the collimating objective lens group 4 and collimated into a parallel beam.

The parallel beam is split by the first polarization beam splitter 10 into a transmitted beam and a reflected beam with polarization states perpendicular to each other; the transmitted beam serves as a measuring beam normally incident upon the plane mirror 5; the reflected beam serves as a reference beam normally incident upon the reference mirror 11; the two beams return along the original path after being respectively reflected by the mirrors, are reflected by the first beam splitter 2 and split by the second polarization beam splitter 12 such that the reference beam and the measuring beam are separated; and the measuring beam is transmitted and normally incident upon the image sensor 3 for collection and imaging, and the reference beam is reflected and transmitted by the third convex lens 13 to become parallel light incident upon the wavefront sensor 14 for collection and imaging.

The laser light source 1 is located at a focal plane of the second convex lens 6, and the exit light is parallel light.

The aperture stop 7 serves as an object plane and is located at an equivalent focal plane of the collimating objective lens group 4.

The collimating objective lens group 4 is composed of the first convex lens 41 and the concave lens 42 to constitute a telephoto objective lens group whose focal length is much greater than that of the first convex lens 41, thereby improving a limit angle resolution of the autocollimator.

The third convex lens 13 is located on the right side of a convergence focus of the reflected beam of the second polarization beam splitter 12, the focus is located at a focal plane of the third convex lens 13, and the reference beam is reflected by the second polarization beam splitter 12, converges and diverges, and is transmitted by the third convex lens 13 to become a parallel beam incident upon a center position of the wavefront sensor 14.

The first turning mirror 8 and the second turning mirror 9 are placed parallel to each other, and respectively have a fixed small angle with a primary optical axis.

The measurement principle is as follows:

When the measured object changes in angles of yaw $\alpha$ and pitch $\beta$, the plane mirror 5 also changes in angles of yaw $\alpha$ and pitch $\beta$. As for the measuring beam incident upon the plane mirror 5, since the plane mirror 5 generates yaw and pitch rotations along with the measured object, the beam reflected by the plane mirror 5 is deflected from the original beam by angles $2\alpha$ and $2\beta$. The reference mirror 11 does not changes in angles along with the rotation of the measured object, and the reference beam incident upon the reference mirror 11 is reflected and returns along the original path.

The returning measuring beam is reflected by the first beam splitter 2, transmitted by the second polarization beam splitter 12 and incident upon the image sensor 3, and displacements x1 and y1 of the spot deviating from the center of the sensor in vertical and horizontal directions are collected. The following relations are met: $x1 = f \cdot \tan(2\alpha)$, and $y1 = f \cdot \tan(2\beta)$, wherein f is an equivalent focal length of the collimating objective lens group 4.

The returning reference beam is reflected by the first beam splitter 2 and reflected by the second polarization beam splitter 12, converges and diverges, and is incident upon the third convex lens 13 to become a parallel beam incident upon the wavefront sensor 14. Beam wavefront phase information of the reference beam is collected. The information reflects information of parallel drift and angular drift caused by disturbances from the external environment, drift of the light source beam and other factors in the reference beam transmission process inside the device. The measuring beam transmitted along the same light path as the reference beam also carries measurement error information $\alpha_0$ and $\beta_0$ due to the above factors.

Error compensation is carried out on the yaw $\alpha$ and the pitch $\beta$ obtained according to the calculating formulae. $(\alpha - \alpha_0)$ and $(\beta - \beta_0)$ after the compensation are the finally obtained yaw and pitch of the measured object.

The two-dimensional photoelectric autocollimation method based on wavefront measurement and correction of this example includes the following steps:

step a, fixing the plane mirror 5 to the surface of the measured object;

step b, turning on the laser light source 1, and adjusting positions of the measured object and the plane mirror 5 such that a geometric center of a measuring beam spot image received by the image sensor 3 is at a center position of the sensor;

step c, measuring, by the wavefront sensor 14, displacement information and wavefront information of the incident reference beam spot, and obtaining the measurement errors $\alpha_0$ and $\beta_0$ caused by the environmental disturbances, the light source drift and other factors in the device measurement process;

step d, measuring, by the image sensor 3, displacement values of an incident measuring beam spot when the plane mirror 5 generates yaw and pitch rotations along with the measured object, wherein distances of the spot deviating from the center position of the image sensor are respectively x1 and y1; and step e, calculating α according to x1=f·tan(2α) based on the displacements x1 and y1 of the measuring beam spot, wherein (α−α$_0$) is the angle of yaw generated by the measured object after the compensation; and calculating β according to y1=f·tan(2β), wherein (β−β°) is the angle of pitch generated by the measured object after the compensation.

In this example, the first convex lens 4 is replaced with the collimating objective lens group 4 composed of the first convex lens 41 and the concave lens 42 as a collimating objective lens unit of the device, so that the focal length of the collimating objective lens is increased, and the limit angle resolution of the device is increased to the nano-radian order under the same conditions. The reference beam is introduced inside the device and transmitted along the same light path as the measuring beam, the wavefront sensor 14 measures the wavefront phase information of the reference beam, and the software algorithm is used to realize the measurement of the aberration of the optical system of the autocollimation device and the error compensation, so that the spot positioning accuracy is improved, thereby improving the measurement accuracy and stability of the autocollimation device. The laser light source 1 is replaced with the beam transmitted through the aperture stop 7 as the light source, so that the measurement instability caused by the drift of the laser light source 1 itself is directly reduced.

In addition, the first turning mirror 8 and the second turning mirror 9 are selected to fold the long-focus light path of the system twice, so that the system device has a smaller volume and is more suitable for the on-site measurement environment, and the influence of the air disturbances on the measurement results caused by the oversize of the device is avoided.

Specific Example II

This example is an example of a two-dimensional photoelectric autocollimation method and device based on wavefront measurement and correction.

Figure 3:
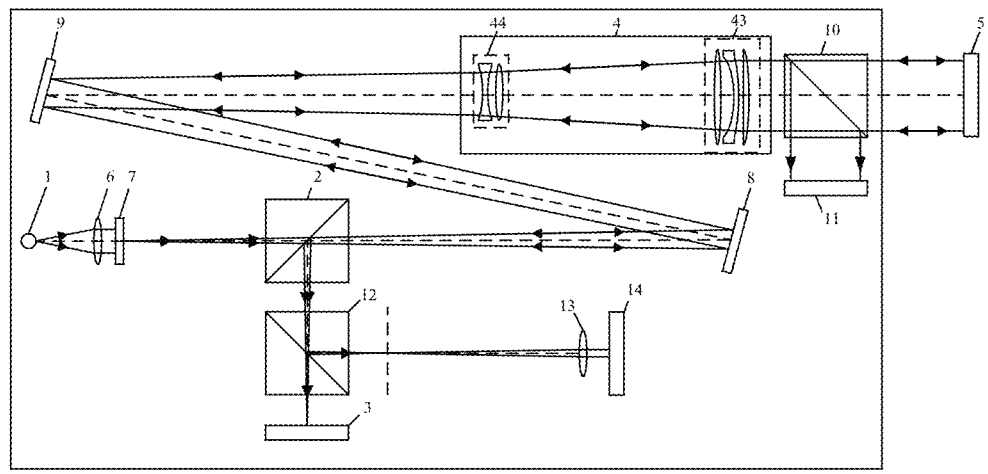
FIG. 3 is a schematic structural diagram of Specific Example II of a two-dimensional photoelectric autocollimation method and device based on wavefront measurement and correction according to the disclosure.

A schematic structural diagram of the two-dimensional photoelectric autocollimation device based on wavefront measurement and correction of this example is shown in FIG. 3. On the basis of Specific Example I, in this example, the first convex lens 41 is replaced with the first combined lens 43, and the concave lens 42 is replaced with the second combined lens 44.

The first combined lens 43 is a combination of 2 or more convex lenses and concave lenses, and has a same effect of making a beam converge as the convex lens. In addition, the first combined lens 43 is composed of the combination of the lenses and has smaller aberration and nonlinearity.

The second combined lens 44 is a combination of 2 or more convex lenses and concave lenses, and has a same effect of making a beam diverge as the concave lens. In addition, the second combined lens 44 is composed of the combination of the lenses and has smaller aberration and nonlinearity.

Figure 4:
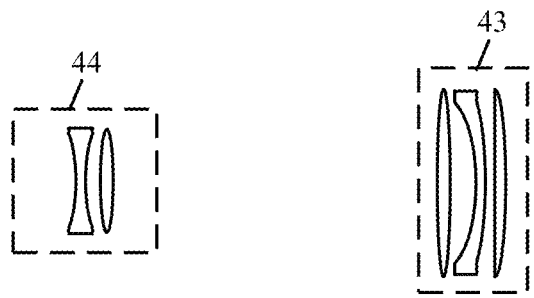
FIG. 4 is a schematic diagram of a collimating objective lens group composed of a combination of a first combined lens and a second combined lens in Example II of the disclosure.

In this example, the single convex lens and concave lens are respectively replaced with the combined lens having the same effect on the beam, as shown in FIG. 4. On the premise of increasing the focal length of the collimating objective lens group, the structure reduces the aberration of the optical system caused by the single lens in a manner of the combination of the lenses and improves the quality of the imaging spot on the image sensor 3, which is conducive to improving the stability and positioning accuracy of the spot, thereby improving the measurement accuracy and stability of the autocollimating angle measurement device.

The two-dimensional photoelectric autocollimation method based on wavefront measurement and correction of this example is the same as in Specific Example I.

Specific Example III

This example is an example of a two-dimensional photoelectric autocollimation method and device based on wavefront measurement and correction.

Figure 5:
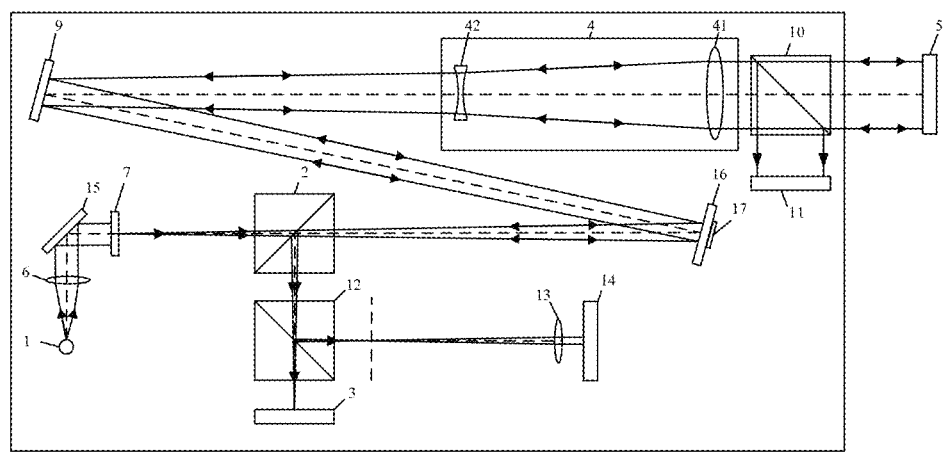
FIG. 5 is a schematic structural diagram of Specific Example III of a two-dimensional photoelectric autocollimation method and device based on wavefront measurement and correction according to the disclosure.

A schematic structural diagram of the two-dimensional photoelectric autocollimation device based on wavefront measurement and correction of this example is shown in FIG. 5. On the basis of Specific Example I, in this example, a deflecting mirror 15 is added between the second convex lens 6 and the aperture stop 7, and the first turning mirror 8 is replaced with a deformable mirror 16 and a deformable mirror driver 17.

The two-dimensional photoelectric autocollimation method based on wavefront measurement and correction of this example includes the following steps:

step a, fixing the plane mirror 5 to the surface of the measured object;

step b, turning on the laser light source 1, and adjusting the positions of the measured object and the plane mirror 5 such that the geometric center of the measuring beam spot image received by the image sensor 3 is at the center position of the sensor;

step c, measuring, by the wavefront sensor 14, the displacement information and the wavefront information of the incident reference beam spot, and obtaining the measurement errors α$_0$ and β$_0$ caused by the environmental disturbances, the light source drift and other factors in the device measurement process;

step d, adjusting a posture of the deflecting mirror 15 and a surface shape of a deformable mirror 16 according to the reference beam wavefront information measured by the wavefront sensor 14 such that the measurement error caused by the environmental disturbances, the light source drift and other factors inside the instrument is 0;

step e, measuring, by the image sensor 3, the displacement values of the incident measuring beam spot when the plane mirror 5 generates the yaw and pitch rotations along with the measured object, wherein the distances of the spot deviating from the center position of the image sensor are respectively x1 and y1; and step f, calculating α according to x1=f·tan(2α) based on the displacements x1 and y1 of the measuring beam spot, wherein α is the angle of yaw generated by the measured object; and calculating β according to y1=f·tan(2β), wherein β is the angle of pitch generated by the measured object.

In this example, the deflecting mirror 15, the deformable mirror 16 and the deformable mirror driver 17 are added as a compensation unit. The wavefront sensor 14 measures the wavefront phase information of the reference beam, and the deflecting mirror 15 and the deformable mirror 16 perform wavefront correction on the measuring beam. Therefore, the measurement and control on the aberration of the optical system of the autocollimation device are realized, the spot imaging quality on the image sensor 3 is improved, and the spot positioning accuracy is improved, thereby improving the measurement accuracy and stability of the autocollimation device and realizing the nano-radian order limit angle resolution.

Specific Example IV

This example is an example of a two-dimensional photoelectric autocollimation method and device based on wavefront measurement and correction.

Figure 6:
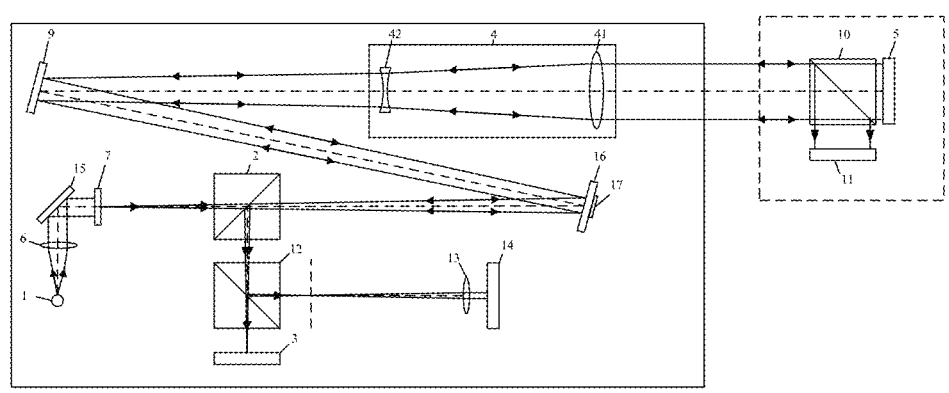
FIG. 6 is a schematic structural diagram of Specific Example IV of a two-dimensional photoelectric autocollimation method and device based on wavefront measurement and correction according to the disclosure.

A schematic structural diagram of the two-dimensional photoelectric autocollimation device based on wavefront measurement and correction of this example is shown in FIG. 6. On the basis of Specific Example I, in this example, the deflecting mirror 15 is added between the second convex lens 6 and the aperture stop 7, and the first turning mirror 8 is replaced with the deformable mirror 16 and the deformable mirror driver 17. The first polarization beam splitter 10, the reference mirror 11 and the plane mirror 5 are together outside the angle measurement device and are located on the side of the measured object.

The two-dimensional photoelectric autocollimation method based on wavefront measurement and correction of this example includes the following steps:

step a, fixing the plane mirror 5 to the surface of the measured object;

step b, turning on the laser light source 1, and adjusting the positions of the measured object and the plane mirror 5 such that the geometric center of the measuring beam spot image received by the image sensor 3 is at the center position of the sensor;

step c, measuring, by the wavefront sensor 14, the displacement information and the wavefront information of the incident reference beam spot, and obtaining angular drift information $\alpha_0$ and $\beta_0$ of the laser light source 1 in the device measurement process;

step d, adjusting yaw and pitch of the deflecting mirror 15, and changing a direction of the light source incident upon an aperture such that the angular drift information of the laser light source 1 is always 0;

step e, adjusting a surface shape of the deformable mirror 16 at any time according to the reference beam wavefront information measured by the wavefront sensor 14 again to compensate for wavefront phase distortion of the measuring beam caused by air disturbances under long distance such that a wave aberration of the measuring beam is 0, thereby improving the imaging quality and stability of the measuring beam on the image sensor 3;

step f, measuring, by the image sensor 3, the displacement values of the incident measuring beam spot when the plane mirror 5 generates the yaw and pitch rotations along with the measured object, where the distances of the spot deviating from the center position of the image sensor are respectively x1 and y1; and step g, calculating $\alpha$ according to $x1=f\cdot\tan(2\alpha)$ based on the displacements x1 and y1 of the measuring beam spot, wherein $\alpha$ is the angle of yaw generated by the measured object; and calculating $\beta$ according to $y1=f\cdot\tan(2\beta)$, wherein $\beta$ is the angle of pitch generated by the measured object.

In this example, the reference mirror 11 is placed on the side of the measured object. The wavefront phase information of the reference beam measured by the wavefront sensor 14 not only includes the aberration information of the optical system itself, but also includes the wavefront distortion information of the beam caused by the air disturbances in the long-distance transmission, and the deflecting mirror 15 and the deformable mirror 16 are used to carry out wavefront correction on the measuring beam to correct the wavefront distortion caused by the aberration of the optical system of the autocollimation device and the air disturbances, thereby improving the ability of the autocollimation device to resist the air disturbances and improving the measurement stability of the autocollimation device under long-distance measurement conditions.

The above description is only the preferred examples of the disclosure and is not intended to limit the disclosure. Any modifications, equivalent substitutions and improvements made within the spirit and scope of the disclosure should be included within the protection scope of the disclosure.

What is claimed is:

1. A method of using a two-dimensional photoelectric autocollimation device based on wavefront measurement and correction to obtain two dimensional photoelectric autocollimation, wherein an influence of beam wavefront distortion on spot positioning errors is calculated and compensated by software, and a measuring method comprising the following steps:

step a, fixing a plane mirror (5) to a surface of a measured object;

step b, turning on a laser light source (1), and adjusting positions of the measured object and the plane mirror (5) such that a geometric center of a measuring beam spot image received by an image sensor (3) is at a center position of the sensor, wherein light emitted from the laser light source (1) is normally incident upon a collimating objective lens group (4) and collimated into a parallel beam, and is normally incident upon the plane mirror (5);

step c, measuring, by a wavefront sensor (14), displacement information and wavefront information of an incident reference beam spot, and calculating measurement errors do and Bo caused by environmental disturbances, light source drift and other factors in a device measurement process;

step d, measuring, by the image sensor (3), displacement values of an incident measuring beam spot when the plane mirror (5) generates yaw and pitch rotations along with the measured object, wherein distances of the spot deviating from the center position of the image sensor are x1 and y1, respectively; and step e, calculating $\alpha$ according to $x1=f\cdot\tan(2\alpha)$ based on the displacements x1 and y1 of the measuring beam spot, wherein f is an equivalent focal length of the collimating objective lens group (4), $\alpha$ is a calculated angle of yaw generated by the measured object, and $(\alpha-\alpha_0)$ is an angle of yaw generated by the measured object after compensation; and calculating $\beta$ according to $y1=f\cdot\tan(2\beta)$, wherein $\beta$ is a calculated angle of pitch generated by the measured object, and $(\beta-\beta_0)$ is an angle of pitch generated by the measured object after the compensation.

2. The method according to claim 1, wherein compensation of an angular drift of the light source by a deflecting mirror is added, the step c further comprising the following steps:

adjusting a posture of the deflecting mirror (15) and a surface shape of a deformable mirror (16) to compensate for a distorted wavefront phase difference according to the reference beam wavefront information measured by the wavefront sensor (14) such that the measurement error $\alpha_0$ and $\beta_0$ caused by the environmental disturbances, the light source drift and other factors inside the instrument is 0.

3. The method according to claim 1, wherein measurement and compensation for the beam wavefront distortion caused by air disturbances under long-distance measurement is added, the step c further comprising the following steps:
adjusting yaw and pitch of a deflecting mirror (15), and changing a direction of the light source incident upon an aperture such that the angular drift information $\alpha_0$ and $\beta_0$ of the laser light source (1) is always 0; and
adjusting a surface shape of a deformable mirror (16) at any time according to the reference beam wavefront information measured by the wavefront sensor (14) again to compensate for wavefront phase distortion of the measuring beam caused by air disturbances under a long distance such that wave aberration of the measuring beam is 0.

4. The method according to claim 1, wherein the two-dimensional photoelectric autocollimation device based on wavefront measurement and correction comprises a laser light source (1), a first beam splitter (2), an image sensor (3), a collimating objective lens group (4), a plane mirror (5), a second convex lens (6), an aperture stop (7), a first turning mirror (8), a second turning mirror (9), a first polarization beam splitter (10), a reference mirror (11), a second polarization beam splitter (12), a third convex lens (13) and a wavefront sensor (14); wherein
light emitted from the laser light source (1) is collimated by the second convex lens (6) and then incident upon the aperture stop (7) in parallel; taking the aperture stop (7) as an object plane, two emitted beams are transmitted by the first beam splitter (2), reflected by the first turning mirror (8) and the second turning mirror (9), normally incident upon the collimating objective lens group (4) and collimated into a parallel beam;
the parallel beam is split by the first polarization beam splitter (10) into a transmitted beam and a reflected beam with polarization states perpendicular to each other; the transmitted beam serves as a measuring beam normally incident upon the plane mirror (5); the reflected beam serves as a reference beam normally incident upon the reference mirror (11); the two beams return along an original path after being respectively reflected by the mirrors, are reflected by the first beam splitter (2) and split by the second polarization beam splitter (12) such that the reference beam and the measuring beam are separated; the measuring beam is transmitted and normally incident upon the image sensor (3) for collection and imaging, and the reference beam is reflected and transmitted by the third convex lens (13) to become parallel light incident upon the wavefront sensor (14) for collection and imaging;
the laser light source (1) is located at a focal plane of the second convex lens (6), and the exit light is parallel light;
the aperture stop (7) serves as the object plane and is located at an equivalent focal plane of the collimating objective lens group (4);
the collimating objective lens group (4) is composed of a first convex lens (41) and a concave lens (42) to constitute a telephoto objective lens group whose focal length is much greater than that of the first convex lens (41);
the third convex lens (13) is located on the right side of a convergence focus of the reflected beam of the second polarization beam splitter (12), the focus is located at a focal plane of the third convex lens (13), and the reference beam is reflected by the second polarization beam splitter (12), converges and diverges, and is transmitted by the third convex lens (13) to become a parallel beam incident upon a center position of the wavefront sensor (14); and
the first turning mirror (8) and the second turning mirror (9) are placed parallel to each other, and a normal direction of the mirror surface has a fixed small angle with a primary optical axis.

5. The method according to claim 4, wherein a first convex lens (41) is replaced with a first combined lens (43), and a concave lens (42) is replaced with a second combined lens (44);
the first combined lens (43) is a combination of 2 or more lenses whose centers are on a same straight line; the first combined lens (43) has a same effect of making a beam converge as the first convex lens (41); the first combined lens (43) is composed of the combination of the lenses and has smaller aberration and nonlinearity; and
the second combined lens (44) is a combination of 2 or more lenses whose centers are on a same straight line; the second combined lens (44) has a same effect of making a beam diverge as the concave lens (42); and the second combined lens (44) is composed of the combination of the lenses and has smaller aberration and nonlinearity.

6. The method according to claim 4, wherein a first turning mirror (8) is removed, and the deflecting mirror (15), the deformable mirror (16) and a deformable mirror driver (17) are added;
the deflecting mirror (15) is placed between a second convex lens (6) and an aperture stop (7), the light emitted from the laser light source (1) is collimated by the second convex lens (6) to become parallel light, and the parallel light is reflected by the deflecting mirror (15) placed inclinedly at an angle of 45°, and then normally incident upon the aperture stop (7); the deflecting mirror (15) is capable of finely adjusting a yaw and a pitch to adjust a direction of the parallel light incident upon the aperture stop (7); and
the deformable mirror (16) is connected with the deformable mirror driver (17), and the deformable mirror driver (17) is capable of controlling a surface shape of a reflecting surface of the deformable mirror (16); and the first turning mirror (8) is replaced with the deformable mirror (16), and a position and a posture of the reflecting surface are not changed.

7. The method according to claim 4, wherein: a first turning mirror (8) is removed, the deflecting mirror (15), the deformable mirror (16) and a deformable mirror driver (17) are added, and a first polarization beam splitter (10) and a reference mirror (11) are outside the instrument and serve as a measured target together with the plane mirror (5);
the deflecting mirror (15) is placed between a second convex lens (6) and an aperture stop (7), the light emitted from the laser light source (1) is collimated by the second convex lens (6) to become parallel light, and the parallel light is reflected by the deflecting mirror (15) placed inclinedly at an angle of 45°, and then normally incident upon the aperture stop (7); the deflecting mirror (15) is capable of finely adjusting a yaw and a pitch to adjust a direction of the parallel light incident upon the aperture stop (7);
the deformable mirror (16) is connected with the deformable mirror driver (17), and the deformable mirror driver (17) is capable of controlling a surface shape of a reflecting surface of the deformable mirror (16); the first turning mirror (8) is replaced with the deformable mirror (16), and a position and a posture of the reflecting surface are not changed; and a combined target is composed of the first polarization beam splitter (10), the reference mirror (11) and the plane mirror (5), and the first polarization beam splitter (10) and the reference mirror (11) do not change with the deflection of the plane mirror (5).

\* \* \* \* \*